United States Patent [19]

Hegarty

[11] Patent Number: 4,542,114
[45] Date of Patent: Sep. 17, 1985

[54] PROCESS FOR THE RECOVERY AND RECYCLE OF EFFLUENT GAS FROM THE REGENERATION OF PARTICULATE MATTER WITH OXYGEN AND CARBON DIOXIDE

[75] Inventor: William P. Hegarty, Allentown, Pa.

[73] Assignee: Air Products and Chemicals, Inc., Allentown, Pa.

[21] Appl. No.: 599,856

[22] Filed: Apr. 13, 1984

Related U.S. Application Data

[63] Continuation-in-part of Ser. No. 404,676, Aug. 3, 1982, abandoned.

[51] Int. Cl.⁴ .................. B01J 21/20; C10G 11/18; C01B 31/20; C01B 3/12
[52] U.S. Cl. ........................... 502/39; 110/345; 208/106; 208/113; 423/224; 423/243; 423/437; 423/655; 502/38; 502/41; 502/42; 502/52
[58] Field of Search .............. 502/38, 41, 52, 517, 502/39, 42; 208/113, 106; 423/235, 235 D, 243, 437, 247, 224, 215.5, 655; 110/345; 431/5; 62/24

[56] References Cited

U.S. PATENT DOCUMENTS

| | | | |
|---|---|---|---|
| 2,322,075 | 6/1943 | Tyson | 252/432 |
| 2,527,575 | 10/1950 | Roetheli | 196/55 |
| 2,548,499 | 4/1951 | Rupp | 423/437 |
| 3,317,278 | 5/1967 | Ruhemann et al. | 423/437 |
| 3,661,543 | 5/1972 | Saxton | 48/296 |
| 3,838,036 | 9/1974 | Stine et al. | 208/120 |
| 3,844,973 | 10/1974 | Stine et al. | 252/417 |
| 3,970,740 | 7/1976 | Reeder et al. | 252/411 |
| 4,036,740 | 7/1977 | Readal et al. | 208/120 |
| 4,054,644 | 10/1977 | Segura et al. | 423/437 |
| 4,118,339 | 10/1978 | Latos | 252/417 |
| 4,146,463 | 3/1979 | Radford et al. | 208/120 |
| 4,176,084 | 9/1979 | Lackenbach | 252/417 |
| 4,201,752 | 5/1980 | Kosseim et al. | 423/235 |
| 4,206,038 | 6/1980 | Smith et al. | 208/113 |
| 4,243,514 | 6/1981 | Bartholic | 208/91 |
| 4,274,942 | 6/1981 | Bartholic | 208/113 |
| 4,300,997 | 11/1981 | Meguerian | 208/120 |
| 4,304,659 | 12/1981 | Pratt et al. | 208/164 |
| 4,323,542 | 4/1982 | Joy, III | 423/247 |
| 4,353,811 | 10/1982 | Fink | 252/420 |
| 4,354,925 | 10/1982 | Schorfheide | 252/419 |
| 4,370,222 | 1/1983 | McGovern et al. | 208/120 |
| 4,388,218 | 6/1983 | Frowe | 252/417 |
| 4,436,716 | 3/1984 | Kvasnikoff et al. | 423/247 |
| 4,452,854 | 6/1984 | Merriam et al. | 423/437 |

Primary Examiner—P. E. Konopka
Attorney, Agent, or Firm—Geoffrey L. Chase; E. Eugene Innis; James C. Simmons

[57] ABSTRACT

A unique process arrangement is disclosed wherein the effluent flue gas from the removal of hydrocarbonaceous coke from particulate matter by combustion in a mixture of pure oxygen diluted with carbon dioxide is processed to provide a carbon dioxide-rich recycle gas stream to be mixed with oxygen as regenerator feed gas; and a net combustion product stream from which are recovered $SO_x$ and $NO_x$ to eliminate atmospheric emissions, and a pure $CO_2$ product for export. An alternate embodiment also produces hydrogen or synthesis gas for export.

9 Claims, 4 Drawing Figures

PROCESS FOR THE RECOVERY AND RECYCLE OF EFFLUENT GAS FROM THE REGENERATION OF PARTICULATE MATTER WITH OXYGEN AND CARBON DIOXIDE

CROSS REFERENCE TO RELATED APPLICATIONS

This application is a continuation-in-part of U.S. application Ser. No. 404,676 filed Aug. 3, 1982 now abandoned.

TECHNICAL FIELD

The present invention is directed to the field of hydrocarbonaceous coke removal from particulate matter by combustion in a gas mixture of commercially pure oxygen diluted with carbon dioxide. A unique process arrangement is disclosed for the recovery of flue gas effluent from the combustion of coke in a mixture of pure oxygen diluted with carbon dioxide, and the processing of effluent to produce a carbon dioxide rich recycle gas stream to be mixed with the pure oxygen, as the combustion feed gas, and a net combustion product stream from which are recovered $SO_x$ and $NO_x$ to eliminate atmospheric emissions, and a pure $CO_2$ product for export. An alternate embodiment also produces hydrogen or synthesis gas for export.

BACKGROUND OF THE PRIOR ART

With the exhaustion of many sources of high quality petroleum resources, the refining industry has turned to the recovery and refining of less desirable petroleum stocks and to the further refining of residues from refining operations of traditional or higher quality petroleum stocks. The refining of low quality stock or the heavy residues from the refining of high quality stocks present problems for the refining industry with respect to the capability of the refining process to handle more complex hydrocarbons of higher molecular weight as well as increased carbon residue, organometallic, nitrogen and sulfur contaminants.

A traditional refining technique has been the use of a fluidized bed catalytic cracker for refining of petroleum stocks. Despite the agitation and inherent abrasions of catalyst in a fluidized bed reactor, the cracking operation which occurs in petroleum refining leaves the particulate catalyst in an inactivated state due to coke buildup on the surface of the catalyst. In order to perform a relatively steady state operation in the fluidized catalytic cracker, it is necessary to remove coked catalyst from the reactor on a continuous basis and to regenerate such catalyst. The regenerated catalyst is then returned to the fluidized catalytic cracker reactor without shut down of the latter.

Regeneration is usually performed in a fluidized bed with an upflowing oxidant gas at elevated temperatures in the regenerator. In this manner, coke on the catalyst is burned and removed as carbon monoxide, carbon dioxide and water. This exothermic combustion provides heat which is absorbed by the regenerator catalyst, and the heated catalyst is returned to the fluidized bed catalytic cracker reactor wherein the regeneration heat is utilized in the endothermic cracking process.

As heavier and heavier petroleum stocks are refined in this manner, additional coking of the catalyst occurs, and additional contamination of the catalyst with nitrogen and sulfur constituents is experienced. The removal of such coke requires a given through-put of oxidant gas. As the coke on catalyst value has gone up with the refining of such heavy residual petroleum stocks, the necessity for more gas through-put in the regenerator has occurred, and this requirement has been the limiting factor on the amount of heavy residual petroleum stock which may be processed in the fluidized catalytic cracker reaction zone. Additionally, as coke on catalyst goes up, more coke burning occurs in regeneration and added heat releases become a limitation on residuum processing.

The traditional oxidant gas used in a regenerator is air. In order to meet the through-put requirements of regenerators experiencing elevated levels of coke on catalyst, the industry has utilized oxygen-enriched air mixtures in order to complete the combustion requirements necessary for removal of the coke from the catalyst [without exceeding velocity limitations]. However, this results in a regenerator temperature increase. McGovern, et al. in U.S. Pat. No. 4,370,222 teaches that oxygen enriched air coupled with heat removal from the catalyst by steam coils or catalyst coolers can achieve increased coke burning capacity within temperature and velocity constraints.

Miguerian, et al. in U.S. Pat. No. 4,300,997 have taught a hot regeneration technique using special catalyst in the fluidized catalytic cracker that promotes the burning of carbon monoxide in carbon dioxide with attendant higher temperatures and velocities in the regenerator and increased heat release. The special catalyst sorbs at least some of the sulfur oxides, but the nitrogen oxides remain untreated.

It is known to utilize an oxygen-containing gas which is diluted with various inert gases. In U.S. Pat. No. 4,146,463, a process is set forth wherein an oxygen-containing gas, such as air is diluted with moderators, such as carbon dioxide, nitrogen or regenerator recycle gas as the oxidant for the coked catalyst. Sulfur oxides and carbon monoxide from other portions of the refinery are also introduced into the regenerator.

In U.S. Pat. No. 4,118,339, a process is disclosed wherein the effluent gas from a fluidized catalytic cracker regenerator is controlled by the introduction of a noble metal oxidation promoter-containing solvent into the regeneration zone. The promoter catalyzes essentially complete combustion of the regenerator carbon monoxide and results in operation at higher temperatures with zeolite thermally stable catalysts and avoids the carbon monoxide pollutant problem encountered with previous regeneration techniques. The increased regeneration gas, heat release and regeneration temperature, however, intensify these limitations with heavy residuum feeds.

U.S. Pat. No. 4,274,942 discloses a process for the regeneration of fluidized catalytic cracker catalyt wherein control of the sulfur oxide emissions is performed by sensing the output from the regeneration zone and pretreating the coked catalyst with steam before regeneration is performed.

In the conventional regeneration of catalyst, air or oxygen-enriched air results in a large amount of nitrogen being passed through the regenerating catalyst with no beneficial effect. Such effluent gases generally contain nitrogen, carbon dioxide, carbon monoxide, oxygen, hydrogen sulfide, sulfur oxides and nitrogen oxides. The high nitrogen content of the effluent gas renders the recovery of the carbon dioxide and the conversion of carbon monoxide to hydrogen impractical and uneconomical. In addition, the sulfur and nitrogen oxides and the carbon monoxide constitute a pollution problem. This problem is heightened by the processing of heavy residuum which contains high levels of nitrogen and sulfur constituents.

The use of mixtures of essentially pure oxygen diluted with flue gas or other inert gases, such as $CO_2$, for the fluidization/combustion gas mixture in an FCC regenerator is taught by Pratt, et al. in U.S. Pat. No. 4,304,659. Since flue gas is typically 80–90% nitrogen when air is the combustion gas, dilution of pure oxygen with flue gas has nearly the same effect on the regenerator heat balance and gas velocity as oxygen enrichment of air.

The use of a mixture of essentially pure oxygen and $CO_2$ as the FCC regenerator combustion gas however, has a significant effect on the regenerator heat balance and gas velocity. The benefits of $O_2/CO_2$ combustion gas mixtures are taught by Rowe in U.S. Pat. No. 4,388,218. Rowe also recognizes that FCC flue gas containing carbon monoxide can be processed to obtain a CO enriched chemical feedstock. However, no process scheme is proposed to recover $CO_2$ from the flue gas for recycling to the regenerator, or CO for chemical feedstock, nor is elimination of flue gas sulfur emissions contemplated.

Different dry and wet flue gas scrubbing technologies are available for eliminating more than 90% of the sulfur oxide emissions from the FCC flue gas. Reeder, et al. teaches in U.S. Pat. No. 3,970,740 that catalyst fines and acid gases can be removed by injection of an aqueous scrubbing mixture in a defined pH range controlled by addition of NaOH or other caustic material. This process is practical when scrubbing flue gas containing predominantly nitrogen, but the NaOH consumption is significantly increased when the flue gas is predominantly $CO_2$. A major water treating problem also results.

Kosseim, et al. in U.S. Pat. No. 3,201,752 teach a process for selective absorption of sulfur oxides from flue gas streams containing 10–15% $CO_2$ and predominantly nitrogen. Again, flue gas containing predominantly carbon dioxide would result in significant $CO_2$ coabsorption and make this process unattractive.

Schorfheide teaches the use of mixtures of $O_2$ and $CO_2$ to regenerate catalytic reformer noble metal catalyst in U.S. Pat. No. 4,354,925. The benefit of increased heat removal allows regeneration with higher oxygen concentration resulting in significantly increased combustion rates. An integrated continuous recycle process is not proposed for this cyclic, non-steady state regeneration operation.

Additional patents of interest include U.S. Pat. Nos. 2,322,075, 3,838,036, 3,844,973, 4,036,740, 4,176,084, 4,206,038 and 4,300,997.

The prior art has recognized the use of oxygen and carbon dioxide mixtures as combustion gas in FCC catalyst regenerators, as well as in catalytic reformer noble metal catalyst regeneration, to burn coke from the spent catalyst and thereby regenerate it for further use. No where in the prior art is an integrating processing scheme taught for the regeneration of catalyst with a mixture of pure oxygen diluted with carbon dioxide, the recovery and recycle of $CO_2$ from effluent flue gas to the regenerator, the recovery and processing of the net CO and $CO_2$ combustion products to saleable products, and the essentially complete elimination of atmospheric emissions by recovery of concentrated $SO_X$, $NO_X$ or $H_2S$ streams for further processing.

While the increased coke burning capacity benefits of using $O_2$ and $CO_2$ mixtures for FCC catalyst regeneration have been recognized in the prior art, these mixtures are not used because the cost of oxygen is so high. However, the integrated process of this invention achieves the FCC coke burning capacity benefits while producing hydrogen and carbon dioxide products for sale and eliminating sulfur and nitrogen oxide atmospheric emissions completely, resulting in an economically attractive way to process high coke yielding feedstocks in an FCC unit without the addition of internal heat removal system to cool the catalyst.

Other fluidized processing systems wherein hydrocarbonaceous coke is removed from particulate matter by combustion in air are described by U.S. Pat. No. 4,243,514 for the treatment of asphalt residuum in a bed of inert particulate matter. U.S. Pat. No. 2,527,575 for fluid coking of residuum, and U.S. Pat. No. 3,661,543 for gasifying fluidized coke. The use of pure oxygen diluted with carbon dioxide can benefit these processes in the same manner as it benefits the regeneration of fluid catalytic cracking catalyst, but the cost of oxygen and carbon dioxide have up to now prevented commercial applications.

BRIEF SUMMARY OF THE INVENTION

The present invention is directed to a process for the recovery, treatment and recycle of a carbon dioxide rich recycle gas as well as the separation of a net combustion product stream from the effluent flue gas from the combustion in a combustion zone of hydrocarbonaceous coke from particulate matter using a mixture of commercially pure oxygen diluted with carbon dioxide from the recycle gas, such process comprising the steps of: recovering the effluent gas from said combustion which contains carbon monoxide, carbon dioxide, oxygen, sulfur oxides, nitrogen oxides and water; oxidizing the carbon monoxide in said effluent gas to carbon dioxide by combusting the carbon monoxide with added oxygen; cooling the oxidized effluent gas and recovering waste heat; quenching the effluent gas by the introduction of water into the gas in order to condense water vapor and entrain particulates into the water in order to separate the condensate and particulates from said effluent gas; compressing the cooled effluent gas and splitting it into a carbon dioxide recycle stream and a net gas stream; recycling the carbon dioxide recycle stream to the combustion zone and mixing it with commercially pure oxygen as the fluidizing and combustion gas; compressing, aftercooling and drying the net gas stream; and separating the dried net gas stream by fractional distillation into a liquid stream containing concentrated oxides of sulfur and nitrogen, an essentially pure liquid carbon dioxide stream and a gaseous oxygen and carbon dioxide-containing stream.

Preferably the stream containing concentrated oxides of sulfur and nitrogen is processed in a Claus sulfur plant or a sulfuric acid plant to produce a valuable by-product and completely eliminate $SO_x$ and $NO_x$ atmospheric emissions.

An advantage of the present process is the utilization of the pure carbon dioxide stream as a recovery medium for an enhanced oil recovery operation. The combustion is preferably the regeneration of catalyst in an FCC regenerator.

The FCC regenerator can also be operated in a complete combustion mode such that the effluent gas from the regenerator contains no carbon monoxide. The same processing steps would be used, except that the combustion of carbon monoxide with $O_2$ would be unnecessary.

Alternatively, in another embodiment the process can comprise the steps of: combusting hydrocarbonaceous coke from particulate matter using a mixture of commercially pure oxygen diluted with carbon dioxide from the recycle gas; recovering the effluent gas from said regenerator, which gas contains, carbon monoxide, carbon dioxide, oxygen, sulfur oxides, nitrogen oxides and water; passing the effluent gas over a deoxygenation and reducing catalyst to eliminate oxygen and reduce $SO_x$ to $H_2S$ and $NO_X$ to $N_2$; cooling and recovering waste heat from said effluent gas stream; quenching the effluent gas by the introduction of water into the gas in order to condense water vapor and entrain particulates into the water in order to separate the condensate and particulates from the effluent gas; compressing said effluent stream to a higher pressure and aftercooling and drying said compressed stream; separating a $CO_2$ recycle stream from the net combustion products; recycling the $CO_2$ recycle stream to the combustion zone and mixing it with commercially pure oxygen gas as the fluidizing and combustion gas; compressing the net gas stream consisting primarily of the net CO and $CO_2$ combustion products; shifting the carbon monoxide content of the net gas stream with steam to carbon dioxide and hydrogen over a shift catalyst; separating the resulting hydrogen from the carbon dioxide in said effluent stream by contact of said stream with a physical solvent to selectively absorb $H_2S$ first, and then carbon dioxide over hydrogen; recovering a concentrated hydrogen product stream and a gaseous carbon dioxide product stream; and recovering a concentrated $H_2S$ stream for further processing, typically in a Claus sulfur plant.

The gaseous carbon dioxide stream can be compressed to high pressure for use as a recovery medium in enhanced oil recovery or liquefied for merchant sales. The concentrated hydrogen stream can be used as is or further purified as necessary. Alternatively, only a part of the carbon monoxide can be shifted to hydrogen to produce an $H_2$ and CO synthesis gas mixture for further use.

Again, preferably the combustion comprises the regeneration of catalyst in an FCC regenerator.

The process of the present invention is also applicable to regeneration of inert particulate matter from a reactor processing and upgrading petroleum crude prior to a fluidized catalytic cracking reactor.

Alternatively, the present invention can be used to regenerate coke in fluid coking and heat and gasify coke in the FLEXICOKING process.

This invention comprises a unique, integrated combination of processing steps using a mixture of $O_2/CO_2$ as FCC regenerator combustion gas that simultaneously increases FCC coke burning capacity; recovers pure, high pressure carbon dioxide product; and essentially eliminates FCC atmospheric emissions of oxides of sulfur and nitrogen and particulates. In the alternate embodiment, a gaseous hydrogen product or synthesis gas is also produced.

DETAILED DESCRIPTION OF THE INVENTION

Fluidized catalytic cracker catalyst regeneration with commercially pure oxygen and diluent carbon dioxide, wherein the oxygen content is 60% to 21%, preferably 30%–24% of the total gas feed to the regenerator, obtains significant benefits over the prior art operations of regenerators, while enabling practical and economical recovery of carbon dioxide, hydrogen and sulfur by-products.

Figure 1:
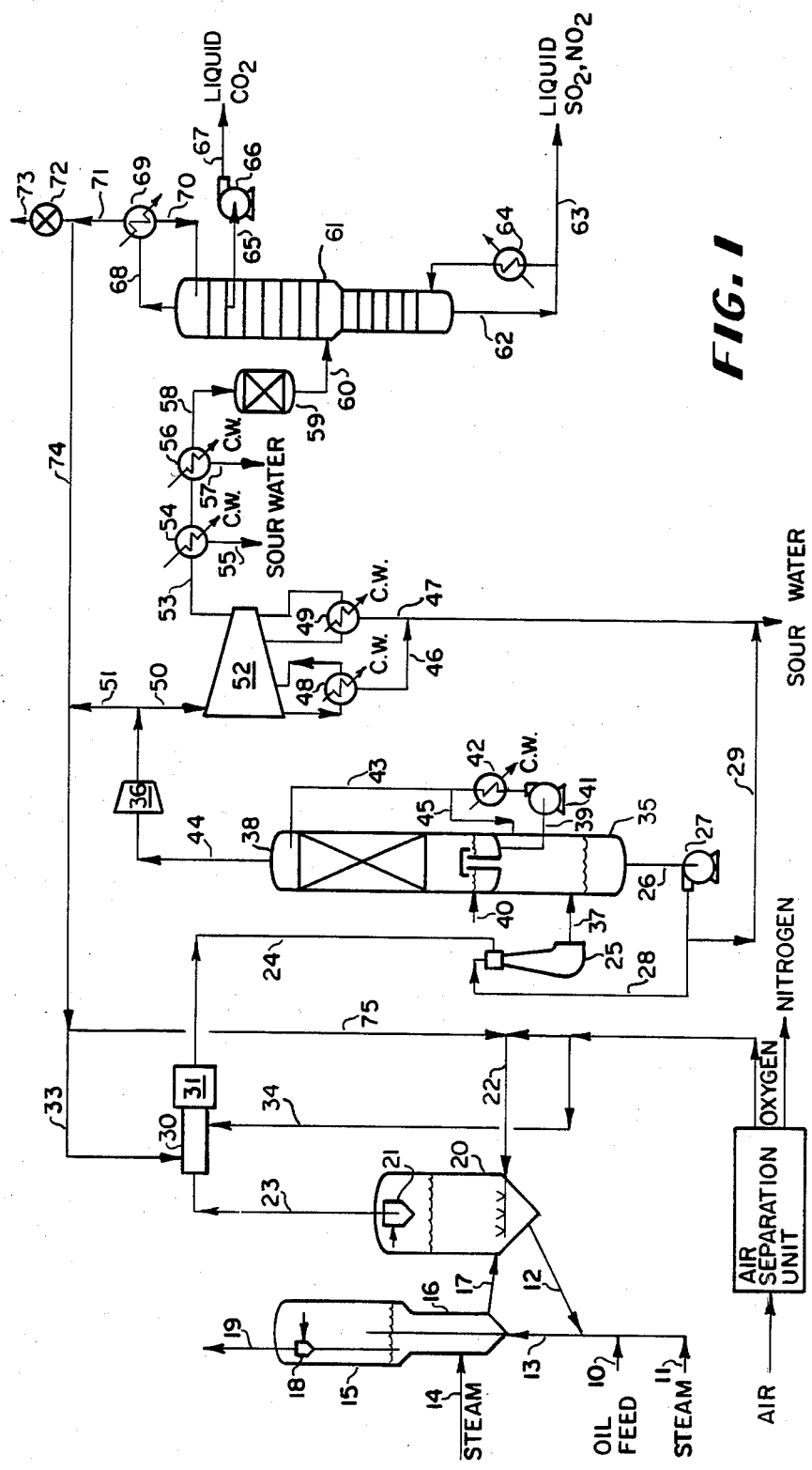
FIG. 1 shows a detailed process flow example of the preferred embodiment of the present invention for the separation, recycle, and recovery of carbon dioxide from the effluent of a fluidized catalytic cracker regenerator using $O_2/CO_2$ combustion gas.

With reference to FIG. 1, the process of the present invention as applied to the FCC process will now be described in detail. An oil feed 10 is dispersed into hot regenerated catalyst 12 in the presence of steam 11. The dispersion passes upward through a riser reactor 13 where the endothermic cracking reactions occur, that also cool the catalyst and deposit coke on the catalyst. The reactor 13 discharges into a separator 15 where the bulk of the catalyst is disengaged. The cracked product vapors pass through a cyclone 18 to separate entrained catalyst and then go to further processing 19. Catalysts in the fluidized catalytic cracking reactor, which has been deactivated by the coking of the catalyst surface with carbon deposits passes down through the reactor stripper 16 where hydrocarbons are removed overhead by steam in line 14. The catalyst now in line 17 is introduced into a typical regenerator 20, which constitutes a fluidized up flow reactor. The catalyst experiences an oxidizing, high temperature environment in which the coked carbon deposits on the catalyst are combusted and separated from the catalyst in the gas phase as combustion products such as carbon dioxide and carbon monoxide, as well as other effluent impurities. The combustion cleaned catalyst is then continuously returned to the cracker reactor for further catalytic duty through line 12.

In the present invention, the oxidizing gas which contacts the spent catalyst in the regenerator comprises a mixture of commercially pure oxygen and preferably a diluting portion of carbon dioxide introduced in line 22. Preferably, the oxygen would constitute 24–30% of the oxidizing gas, while carbon dioxide would constitute essentially the rest of the gas as a diluent. The oxidizing gas is a mixture of oxygen 76 separated in an air separation unit and the recycled carbon dioxide 75 from the effluent of the regenerator. The bulk of the oxygen reacts with the coke on the catalyst to heat it and regenerate or decoke it by the exothermic reactions:

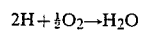

$$C + \tfrac{1}{2}O_2 \rightarrow CO$$

$$C + O_2 \rightarrow CO_2$$

$$CO + \tfrac{1}{2}O_2 \rightarrow CO_2$$

The heat capacity of the carbon dioxide will absorb some of the heat of reaction and moderate the regenerator temperature increases. The effluent from such an oxygen enriched regeneration is typically comprised of carbon dioxide 83%, water 9%, carbon monoxide 7%, oxygen 0.5%, sulfur oxides 0.5%, and nitrogen oxides 500 ppm. This effluent flue gas stream is separated from catalyst in cyclone separator 21. The regenerator 20 is of typical materials of construction and subject to typical temperature limitations. However, the carbon dioxide diluent of a 70/30 carbon dioxide/oxygen regeneration feed gas has a heat capacity equivalent to a nitrogen diluent in air. Accordingly, the higher oxygen concentration, while reducing regenerator velocities and relaxing velocity related capacity limitations will not increase regeneration temperatures above those for air regeneration, typically 620°–760° C.

The flue gas stream in line 23 comprises oxygen, carbon monoxide, carbon dioxide, water, sulfur oxides, nitrogen oxides and particulates. The latter components constitute noxious by-products which, if vented to the atmosphere, would present environmental pollution problems. Therefore, it is desirable to eliminate these components of the effluent flue gas stream 23. The stream 23 flue gas passes to the carbon monoxide oxidation zone 30, where the effluent flue gas stream is subjected to further oxidation in the presence of additional oxygen 34. The residual carbon monoxide and any fuels in the effluent flue gas stream are combusted to carbon dioxide. This combustion treatment of the effluent flue gas stream further elevates the temperature of the stream. Therefore, it is necessary to moderate the combustion temperature by recycling carbon dioxide in line 33. The hot combustion gases then pass through a waste heat boiler 31 and are cooled to about 260° C. by generating steam.

When operating the FCC generator in the complete combustion mode wherein all CO is combusted to $CO_2$ in the FCC regenerator such that the flue gas stream 23 comprises oxygen, carbon dioxide, water, sulfur oxides, nitrogen oxides, particulates and no carbon monoxide, the flue gas stream 23 is sent directly to the waste heat boiler 31 and no carbon monoxide combustion zone 30 is necessary or the gas passes through the zone without operation of the combustion.

The oxidized effluent stream 24 is adiabatically quenched to typically 95° C. by recycle water stream 28 typically in a venturi scrubber 25 to separate the fine catalyst particulates from the vapor stream. The venturi scrubber effluent in stream 37 is separated into a vapor and liquid phase in vessel 35. The liquid phase consists of primarily water with essentially all catalyst particulates and sulfur trioxide in the FCC regenerator effluent 23. This water in line 26 is pumped (27) back to the venturi scrubber 25 in line 28. A net process water stream 29 containing the net water from combustion of coke and net catalyst particulates is withdrawn for further processing. Other gas cooling schemes can be employed including schemes without the venturi scrubber or with heat exchangers in place of the direct quench tower. However, in the preferred method with a venturi scrubber followed by a direct quench cooling tower particulate removal is facilitated, temperature is reduced to a range where plastic packing and rubber linings can be used to reduce corrosion, and pressure drop is minimized.

The vapor phase from separator 35 comprised of carbon dioxide, oxygen, water, sulfur oxides, and nitrogen oxides passes into vessel 38 where it is further quenched to typically less than 38° C. against a spray of cool water from line 43. The quench water is withdrawn from vessel 38 in line 39 and pumped (41) through cooler 42 to reduce the temperature to typically less than 35° C. and reinjected to quench tower 38 in line 43. Net process water is withdrawn in line 45 and injected into vessel 35. Fresh makeup water can be added to quench tower 38 in line 40, but process water produced from the combustion of coke should be sufficient to makeup for all water losses.

Since the regenerator effluent stream 23 contains water and sulfur trioxide, sulfuric acid mist will be present and all process streams below the flue gas water dewpoint typically between 70°–200° C. will be corrosive. This includes all streams processed in the venturi scrubber 25, separator 35, and quench tower 38. Most sulfuric acid will be absorbed in the water resulting in the net water stream 28 having a low pH.

The net effluent gas 44 from quench tower 38 will contain most of the sulfur dioxide produced from the combustion of coke. No attempt is made to absorb $SO_2$ in the process water. Most sulfur trioxide and sulfuric acid will be absorbed in the quench water, but traces of acid mist particles less than 1 micron in size will remain in effluent stream 44.

Effluent stream 44 is then pressured up in booster compressor 36 to the level required to recycle 60–80% of the stream back to the FCC regenerator 20. Typical FCC regenerator outlet pressure is 1–2.5 atmospheres resulting in required booster compressor outlet pressures of 1.5–3.0 atmospheres. The booster compressor 36 outlet temperature must typically be kept below about 65° C. to prevent serious corrosion problems from the trace quantities of sulfuric acid mist when using conventional compressor material alloys. This can be accomplished by interstage cooling or chilling the compressor suction.

At this point in the processing, a portion of the effluent stream is then separated into a recycle stream 51 and a remaining stream 50. Preferably the recycle stream 51 would be set to dilute the oxygen in stream 22 to 30% and provide necessary $CO_2$ in stream 33 for CO combustion 30. This would be about 61–80% of stream 44, with the net gas stream 50 comprising the balance of about 30%. The recycle stream in line 51 is directed back to the inlet of the regenerator 20 in line 75 to be blended with pure oxygen in line 76 and introduced into the regenerator 20 in line 22. The carbon dioxide acts as a diluent to control oxidation and peak temperature of the regenerator and catalyst being regenerated. The recycle 51 can be supplemented with additional carbon dioxide 74 from downstream processing.

The net combustion gas stream in line 50 is then directed through a multistaged, intercooled compressor 52 to achieve an exit pressure of about 20–40 atm. Sour, sulfur oxides-containing condensate streams are separated in the intercooling heat exchangers 48 and 49 are removed in lines 46 and 47 and join the previous sulfur containing water stream in line 29. The compressed effluent stream in line 53 is then aftercooled in heat exchangers 54 and 56 and additional sour water is condensed and removed 55 and 57.

The effluent stream 58 is cooled to about 50° C. and dehydrated in drier 59. The drier 59 can constitute a switching bed of dessicant such as alumina or it can be any other known drying means for gas streams, such as a recirculating glycol treatment.

The dried effluent stream in line 60 is introduced into a distillation column 61 wherein the carbon dioxide component of the stream is separated from residual sulfur and nitrogen oxides. The sulfur and nitrogen oxides are removed from the distillation column 61 as a net bottom stream in line 63. This net stream can be further processed in a Claus plant to provide an elemental sulfur product for sale or export. Alternately, it can be fed to a sulfuric acid plant. Reboil for the column is supplied in heat exchanger 64. $SO_2$ and $NO_2$ are less volatile than $CO_2$ and will therefore be separated from $CO_2$ in the bottom stream 62. While NO is very volatile, boiling at $-152°$ C., the equilibrium of the reaction:

$$NO + \tfrac{1}{2}O_2 \rightarrow NO_2$$

favors $NO_2$ formation at low temperatures and uniquely the rate of $NO_2$ formation increases as temperature is reduced. Therefore, with excess $O_2$ present, calculations indicate no NO will be present in the distillation tower; all NO will convert to $NO_2$ which is then separated from $CO_2$ and removed with the sulfur oxides in stream 63.

An essentially pure carbon dioxide liquid product can be taken as a sidestream from the rectification section of the distillation column and exported as a product. This product stream is removed in line 65 and pumped to pressure in pump 66 before export in line 67. The carbon dioxide mid-cut stream is sufficiently pure such that it may be pipelined and utilized in other industrial processes such as enhanced oil recovery operations. Note however that the liquid $CO_2$ product will be contaminated with trace quantities of $O_2$. The trace $O_2$ can be eliminated if desired by using a two column distillation system with the second column being a stripper with bottom reboiling to strip trace $O_2$ overhead for reinjection into distillation column 61 or into refrigerated heat exchanger 69 for recovery. The stripper column liquid can be a sidestream as stream 65 or can be taken from reflux stream 70.

A carbon dioxide and oxygen-containing overhead stream is removed from distillation column 61 in line 68. Reflux is provided for the upper portion of column 61 by cooling overhead stream 68 in refrigerated heat exchanger 69. A part of the stream is condensed and returned in line 70 as reflux. The remaining portion of the overhead stream is removed from heat exchanger 69 in line 71. This stream may be mixed with the recycle $CO_2$ 51 in line 75 and recycled to the fluidized catalytic cracking regenerator 20 or delivered to oxidation zone 30. Recycling stream 74 results in nearly complete utilization of the oxygen introduced into the regeneration and recycle system of the present invention. A small portion of the oxygen and carbon dioxide-containing stream in line 71 is vented to the atmosphere through valve 72 and line 73 to purge inerts, such as $N_2$ and argon, from the system.

Under some circumstances, diluent carbon dioxide in stream 75 may be imported or it may be desirable to operate the regenerator utilizing pure oxygen undiluted with carbon dioxide. Under these circumstances, all of stream 44 will be compressed and stream 71 can be vented or added to stream 22. Under the circumstances of pure oxygen gas introduction into the regenerator, increased temperatures of about 50° C. can be expected to be experienced by the catalyst and the regenerator. In some regeneration systems it would be expected that oxygen atmospheres in the heated regenerator would not approximate dangerous conditions in light of the back mixing in the fluidized bed of the regenerator, in which oxygen would be rapidly mixed with the constituents and gas phase existing in the regenerator. Accordingly, to the extent that complete back mixing occurs, the regeneration of catalyst with pure oxygen would not necessarily result in excessive temperatures. All back mix systems, however, do involve a finite mixing zone. In such a fluidized catalytic cracker regeneration mixing zone, oxygen concentrations would traverse the range from essentially 100% oxygen at the inlet zone of the regenerator to extremely low concentrations of oxygen at the effluent zone of the reactor. In the preliminary mixing zones of the regenerator, excessive high oxygen reaction rates and heat release could be expected to give locally high temperatures that could damage some catalysts and regeneration equipment materials. Additionally, inlet oxygen metal piping and distributors in some systems might be expected to ignite and burn in such pure oxygen atmospheres. Therefore, in such systems, it would be preferable to utilize the preferred embodiment of the present invention in which the inlet gas to the regenerator contains a predominant amount of carbon dioxide diluent such as is supplied in the present invention through lines 51 or 74 or from an extraneous source providing fresh carbon dioxide. The molar heat capacity of carbon dioxide is about 60% greater than the molar heat capacity of nitrogen, and the mixing of a carbon dioxide diluent to 30% oxygen for the influent gas provides a heat capacity equivalent to air despite the enrichment of 30% oxygen existing in the inlet gas. This would favorably avoid metal component flammability and the overheating of catalyst with its attendant problems in catalyst life and activity.

This invention comprises a unique, integrated combination of processing steps, using a mixture of $CO_2$ and $O_2$ for FCC regeneration that simultaneously increases FCC coke burning capacity, recovers a pure high pressure $CO_2$ product (preferably as a liquid) and completely eliminates noxious C, particulates, and sulfur and nitrogen oxide emissions. While the benefits of $CO_2$ and $O_2$ mixtures in increasing FCC coke burn capacity compared to air regenation have been recognized in the prior art, heretofore $O_2/CO_2$ regeneration has not been practiced because it is uneconomical due to the high cost of $O_2$ and $CO_2$. However, it becomes economical with the preocess combination of this invention because of the value of the recovered $CO_2$ product and the elimination of flue gas emissions which eliminates the need for expensive flue gas desulfurization processes that achieve only partial SOX removal and minimal NOX removal.

When air is used for FCC catalyst regeneration, the regenerator flue gas is typically $N_2$ comprising about 14 vol% $CO_2$, excess $O_2$, and SOX and NOX. Recovery of pure $CO_2$ from this gas is expensive. $CO_2$ containing $N_2$ is of little value in enhanced oil recovery or merchant markets. Separation by distillation is impractical because the gas would have to be compressed so that $CO_2$ partial pressure would be above the triple point pressure of 5.1 atm. For 14% $CO_2$ flue gas, the distillation pressure would have to be above 36 atm. and the compression energy requirements and costs would be prohibitive. But when $CO_2$ and $O_2$ mixtures are utilized, the regenerator flue gas is primarily $CO_2$ contaminated with SOX, NOX, $O_2$, and some argon (after CO is combusted to $CO_2$ and water is removed). After 60–80% of the flue gas is recycled to the regenerator to provide $CO_2$ diluent for the $O_2$, the net combustion flue gas can be compressed to above 5 atm. to liquefy, recover and purify the $CO_2$ by distillation. The compression requirements are lower than with air because the pressure is reduced and the large $N_2$ compression requirement is eliminated.

After the net $CO_2$ is compressed to recover high pressure $CO_2$ gas or liquid product, it then becomes inexpensive and practical to separate the SOX, NOX and excess $O_2$ by distillation. Sulfur dioxide is much less volatile than $CO_2$ and is therefore easily distilled from $CO_2$. $SO_3$ is even less volatile and is readily separated with the $SO_2$. $NO_2$ is also less volatile than $CO_2$ and will separate with the $SO_2$ and $SO_3$. While NO is very volatile, boiling at $-152°$ C., it will react with excess $O_2$ in the colder portions of the distillation system to form nonvolatile $NO_2$ and therefore separate with the $SO_2$ and $SO_3$ as previously noted. Accordingly, it can be seen that this reaction in the distillation system is an important means of obtaining complete NO separation.

In the process of the present invention the use of existing flue gas wet scrubbing technology to remove sulfur oxides typified by Reeder, et al, in U.S. Pat. No. 3,970,740 is not practical. The high $CO_2$ concentration (86% vs. Reeder's 15%) would result in high caustic consumption resulting in a high water injection rate and a major water treating problem. The water containing sodium sulfite requires significantly more processing than the distillation separation of $SO_x$ and $NO_x$ which can then be directly processed in a Claus or sulfuric acid plant. In the present process, no attempt is made to absorb $SO_2$ from the flue gas into the water beyond what naturally occurs. No continuous water injection is required as the combustion product water is sufficient to rid the system of particulates. This reduces the amount of water and the sulfate concentration significantly compared to Reeder, et al., thereby minimizing the water treating requirements.

Separation of $O_2$ from $CO_2$ by distillation is also complicated by $CO_2$ freezing problems that develop below the $CO_2$ triple point temperature of $-56.5°$ C. To separate pure $O_2$ would require $O_2$ liquid reflux at temperatures below the $O_2$ critical temperature of $-118°$ C. In the proposed system, the $O_2$ rectification section top temperature is held above $-56.5°$ C. to avoid freezing and this gives an impure $O_2$ reject stream containing substantial $CO_2$. Preferably, in the proposed system this reject stream is recycled to the FCC regeneration section thereby avoiding losses of valuable $O_2$ and $CO_2$. A small vent stream will be required to purge inerts from the system.

From the foregoing, the unique integrated interaction of the proposed system is evident. FCC regeneration with $O_2/CO_2$ can give increased coke burning capacity, but alone it is uneconomical. Recovery of $CO_2$ from FCC regenerator flue gas is desirable but uneconomical with air regeneration due to the large amount of nitrogen present. Elimination of FCC regenerator SOX and NOX emissions is increasingly required to meet air quality demands, but available technology is expensive and gives only partial removal. The proposed invention allows substantially complete $O_2$ utilization, substantially complete recovery of pure $CO_2$ product and essentially complete separation of SOX and NOX pollutants from the flue gas that can be processed in a Claus sulfur plant or in a sulfuric acid plant to generate usable by-products.

Figure 2:
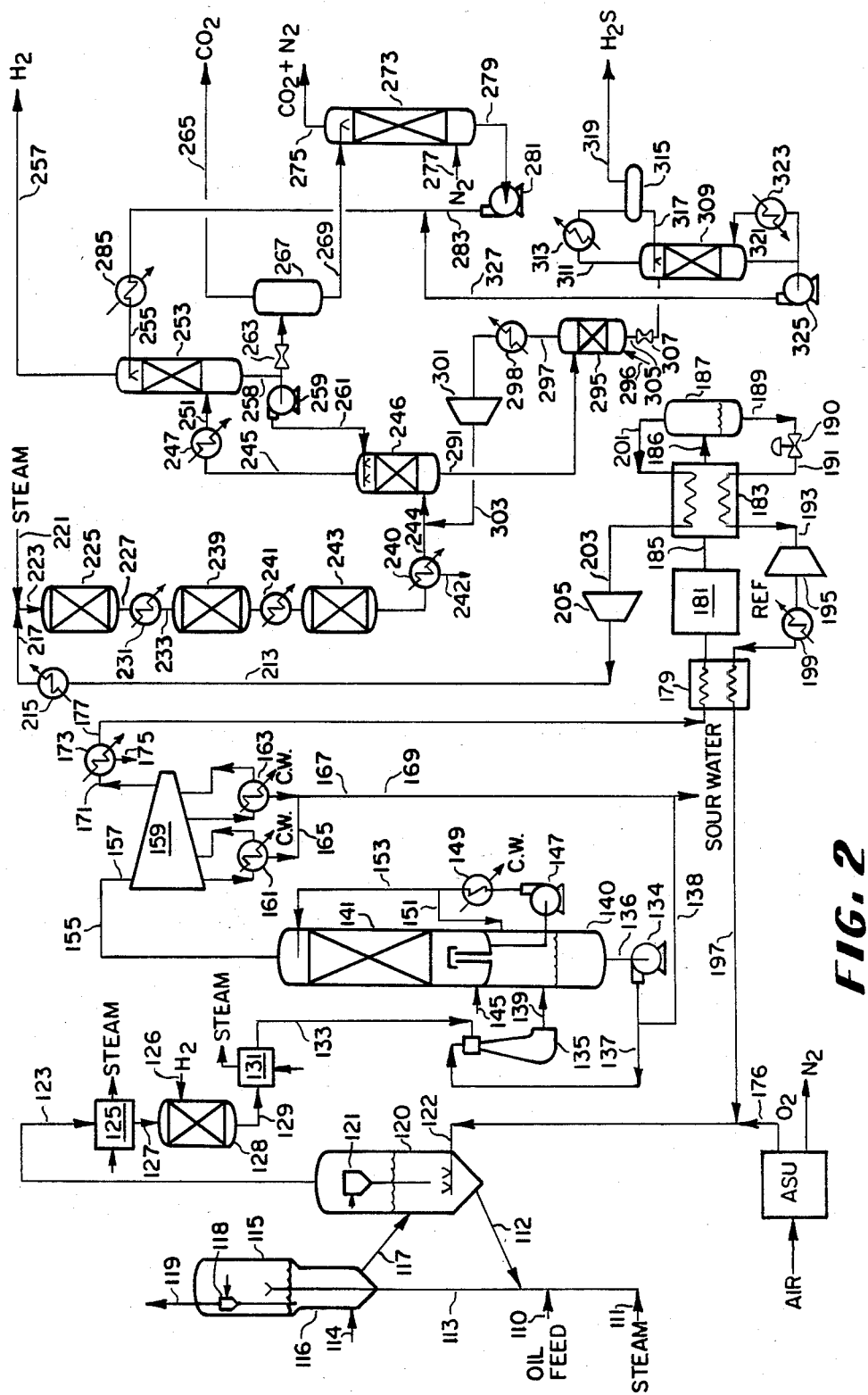
FIG. 2 shows a detailed process flow example of the alternate embodiment of the present invention for the separation, recycle, and recovery of gaseous hydrogen and $CO_2$ from the effluent of a fluidized catalytic cracker regenerator using $O_2/CO_2$ combustion gas.

In FIG. 2, an alternate embodiment of the present invention is shown in which coked, spent catalyst 117 from a fluidized catalytic cracker reactor 113 is introduced into the regenerator 120 and is regenerated by an upflow 122, in a fluidizing manner, of a mixture of commercially pure oxygen gas diluted with carbon dioxide in the same manner previously described in the preferred embodiment of this invention. The reactor and regenerator and their parts are numbered corresponding to FIG. 1, but with the 100 series of numbers.

The effluent stream from the regenerator leaves in line 123 and consists of the same components as described in the preferred embodiment—CO, $CO_2$, $H_2O$, $O_2$, sulfur oxides, nitrogen oxides and particulates.

The effluent gas stream 123 is cooled in waste heat boiler 125 to 150°–425° C. by producing high quality steam. The cooled effluent 127 is passed through catalytic reactor 128 to eliminate oxygen and reduce sulfur and nitrogen species to $H_2S$ and $N_2$. The catalyst is typically sulfided cobalt and molybdenum on silica-alumina support as described by Beavon in U.S. Pat. No. 3,752,877 incorporated here by reference. The temperature will be a function of the specific catalyst employed. The hydrogen required for the reduction reactions will be generated by shifting the CO and $H_2O$ in FCC effluent stream 127 over the catalyst. Since the oxygen content of effluent 127 can vary, it may be necessary to have multiple reactor beds with interstage cooling to remove the heat of reaction. In this instance, it may be desirable to add hydrogen 126 to reactor 128 to enhance the sulfur and nitrogen reduction rates.

The deoxygenated and reduced effluent gas 129 from reactor 128 now comprises carbon monoxide, carbon dioxide, water, hydrogren, $H_2S$, $N_2$ and particulates along with other traces such as argon introduced in the oxygen stream 176 to the regenerator. Stream 129 is cooled in waste heat boiler 131 to about 260° C. producing high quality steam. The cooled effluent 133 is then adiabatically quenched to less than 95° C. by recycle water stream 137 typically in a venturi scrubber 135 to separate the fine catalyst particulates from the vapor stream. The venturi scrubber effluent 139 is separated into a vapor and liquid phase in vessel 140. The liquid phase is primarily water containing essentially all particulates from stream 133 and some dissolved $H_2S$. The sour water 136 is pumped (134) back to the venturi scrubber 135 in line 137. A net sour process water stream 138 produced from the combustion of coke and containing the net catalyst particulates is withdrawn for further processing. Other gas cooling schemes can be employed including schemes without the venturi scrubber or with heat exchangers in place of the direct quench tower. However, in this preferred method with a venturi scrubber followed by a direct quench cooling tower, particulate removal is facilitated, temperature is reduced, and pressure drop is minimized.

The vapor phase from separator 140 comprising CO, $CO_2$, $H_2O$. $H_2S$, $N_2$, $H_2$ passes into vessel 141 where it is further typically quenched to less than 38° C. against a spray of cool water from line 153. The quench water is withdrawn from vessel 141 in line 143 and pumped (147) through cooler 149 to reduce the temperature to typically less than 35° C. and reinjected into quench tower 141 in line 153. Net process water is withdrawn in line 151 and injected into vessel 140. Fresh makeup water can be added to quench tower 141 in line 145, but process water produced from the combustion of coke should be suffiicient to make up all water losses. Since all sulfur oxides are reduced to $H_2S$ in reactor 128, no sulfuric acid is present, thus eliminating sulfuric acid corrosion problems. The quenched effluent gas 155 from tower 141 is compressed in a multistage compressor 159 preferably to a pressure of 10-20 atm. depending on the $CO/CO_2$ ratio of the gas. Interstage cooling is performed in exchangers 161 and 163 and sour water is removed in lines 165 and 167 and combined with sour water from line 138 in line 169. The compressed gas 171 is then aftercooled to a temperature of about 40° C. in aftercooling heat exchanger 173 which is supplied with ambient cold water and additional sour water is knocked out in line 175.

The recycle $CO_2$ in effluent stream 177 is separated from the net combustion products in an auto-refrigerated, Joule-Thomson flash separation. The compressed gas in stream 177 is cooled to as low a temperature as possible—typically 5°–10° C.—in heat exchanger 179 to condense as much water as possible without forming hydrates. Water is separated from the chilled gas which is then dried in an absorption system 181 similar to that described in the primary embodiment. The dried gas enters the auto-refrigerated heat exchanger 183 where it is cooled to about −50° C. The recyle $CO_2$ is liquefied and then separated from the net combustion gas vapor 201 in vessel 187. The net gas vapor 201 is warmed to about 0° C. against the cooling feed in exchanger 183. The liquid recycle $CO_2$ 189 is flashed in J-T valve 190 to obtain refrigeration. To prevent freezing of the recycle $CO_2$, the pressure downstream of valve 190 is controlled to maintain the temperature in line 191 at about −55° C. The cold recycle $CO_2$ in line 191 is warmed against the cooling feed in exchanger 183. The rewarmed recycle $CO_2$ 193 is then expanded to about 1.5-3 atm. in turbine 195 to recover power, warmed in exchanger 199, providing low temperature cooling for the downstream gas separation, and finally warmed against the cooling effluent gas 177 in exchanger 179. The recycle $CO_2$ 197, comprising primarily $CO_2$ and small quantities of CO and $H_2S$, is then mixed with oxygen 176 to provide combustion gas 122 to the FCC regenerator.

The compressor 159 supplies the energy input to separate the recycle $CO_2$ and net combustion products, with the pressure and temperature of separator 187 controlled to make the amount of recycle $CO_2$ 197 required for regenerator combustion gas 122. The refrigeration duty required in exchangers 179 and 183 and the power recovered in turbine 195 are dependent on atmospheric energy losses. The insulation standards employed will define whether auxilliary refrigeration is required to cool stream 186 and whether turbine 195 is economically justified.

The warmed vapor stream 203 containing the net combustion products CO, $CO_2$, $H_2S$, $N_2$ and $H_2$ is compressed in compressor 205 to about 40 atm.

The net effluent flue gas stream 213 is then heated in heat exchanger 215 to 315°–345° C.

Steam is added to the heated stream 217 from line 221 and the combined stream in line 223 is introduced into the first of three shift reactors 225, 239 and 243.

Shift reactor 225 contains a sour shift catalyst because of the $H_2S$ content of the gas, such as fulfided cobalt-molybdenum on alumina able to withstand large temperature increases. The shift reaction converts carbon monoxide as follows:

$$CO + H_2O \rightarrow H_2 + CO_2$$

The reaction partially shifts the carbon monoxide toward equilibrium with hydrogen exothermically, resulting in a substantial temperature rise. Exit stream 227 from the reactor 225 is cooled in heat exchanger 231 to 315°–345° C. and the cooled stream in line 233 undergoes a second shift in reactor 239. This reactor also contains sour shift catalyst and additional carbon monoxide is shifted to hydrogen. The effluent is cooled in heat exchanger 241 to approximately 200° C. and enters the third shift reactor 243 containing sour shift catalyst.

The shifted effluent gas stream is cooled in heat exchanger 240 to ambient temperature and condensate is removed in line 242. The cooled stream 244 comprises primarily hydrogen, carbon dioxide, and water with small amounts of CO, $H_2S$, and argon. It enters hydrogen sulfide absorber tower 246 where it is contacted with an $H_2S$ lean physical solvent 261 to selectively absorb essentially all hydrogen sulfide and only a fraction of the $CO_2$. $H_2S$ rich solvent 291 is withdrawn from the bottom of absorber 246 and fed to $CO_2$ stripper 295. The coabsorbed $CO_2$ is flashed and stripped with some of the product hydrogen 296 from the $H_2S$ rich solvent in vessel 295. The $CO_2$ vapor 297 is compressed to about 40 atm. in compressor 301. The high pressure $CO_2$ stream 303 is combined with the cooled shift effluent stream 244 and recycled to the $H_2S$ absorber 246. The $H_2S$ rich solvent 305 from stripper 295 is flashed to about 1.5 atm. in valve 307 and injected into the $H_2S$ stripper 309 to regenerate the solvent. Stripping gas is generated by reboiler 323. The stripper overhead 311 is partially condensed in exchanger 313 and separated in vessel 315. The liquid 317 is returned to the column as reflux and the vapor 319, which contains concentrated $H_2S$, is withdrawn from separator 315 as a net product 319 for processing to sulfur typically in a Claus sulfur plant. The lean solvent 321, containing essentially no $H_2$ or $CO_2$ is withdrawn from the $H_2S$ stripper 309 bottoms and pumped (325) to about 40 atm. This solvent in line 327 is combined with lean solvent 283 from the $CO_2$ stripper 273.

Overhead gas 245 from $H_2S$ absorber 246, comprising $CO_2$ and $H_2$ with some CO and essentially no $H_2S$ is cooled in exchanger 247 and fed to $CO_2$ absorber 253 in line 251 where it is contacted with clean physical solvent 255 to absorb carbon dioxide. Hydrogen product, esssentially free of carbon dioxide is removed from tower 253 as an overhead stream in line 257. The hydrogen stream 257 contains residual carbon monoxide that typically would be essentially completely eliminated by catalytic methanation.

The carbon dioxide loaded solvent is removed as bottom stream 258, and divided into two streams. Part of the stream is pumped (259) to about 40 atm. to provide $H_2S$ lean solvent 261 for $H_2S$ absorber 246. The net $CO_2$ rich solvent is flashed in valve 263 before being phase separated in separator 267. Gaseous carbon dioxide is removed as an overhead stream in line 265 as a pure product that can be compressed to high pressure and used for enhanced oil recovery operations or liquefied for export product uses.

The solvent in separator 267 is removed as bottom stream 269 and introduced into stripper column 273 where residual carbon dioxide is stripped from the solvent with nitrogen introduced in line 277 and the stripped gas is vented in line 275. The lean solvent is removed in line 279 and pumped to pressure in pump 281. Lean solvent 283 is combined with lean solvent 327, cooled by heat exchanger 285 and re-introduced into tower 253 through line 255.

This net gas separation process is described by Nicholas, et al. in U.S. Pat. No. 4,242,108 incorporated herein by reference. This embodiment of the present invention has the same advantages over the prior art as the primary embodiment, namely;

increases FCC regenerator coke burning capacity.

eliminates FCC sulfur and nitrogen oxide and particulate atmospheric emissions, produces a pure $CO_2$ product for sale in enhanced oil recovery or merchant use, plus two additional advantages:

produces a pure hydrogen product, and reduces oxygen consumption.

FCC regenerator flue gas comprises typically 0–15% CO, 10% $H_2O$, <1% sulfur and nitrogen oxides, traces of $H_2S$ and oxygen, with $CO_2$ making up the balance when the fluidization/combustion gas is a mixture of $O_2/CO_2$. To make production of hydrogen from this stream practical, a process must accomplish four things:

elimination of oxygen and potential for producing solid sulfur by reaction with $H_2S$, separation of recycle $CO_2$ from the net flue gas combustion products, concentration of CO for favorable shift equilibrium, and separation of sulfur species from product $CO_2$.

The unique, integrated process configuration defined in this embodiment makes hydrogen production from FCC flue gas CO economically practical. The deoxygenation, reduction reactor, the auto-refrigerated J-T $CO/CO_2$ separation, the sour shift system, and the selective $H_2S$ removal system work in concert to achieve the benefits of this embodiment.

The deoxygenation, reduction reactor is required to prevent plugging from the formation of solid sulfur in the downstream equipment via reaction of oxygen, $H_2S$, and $SO_2$. Trace components such as COS and nitrogen oxides are also eliminated in the process. By reducing all sulfur and nitrogen species to $H_2S$ and $N_2$, sulfur buildup in the recycle loop is reduced since $H_2S$ is much more volatile than $SO_2$; the corrosion problem caused by sulfuric acid formation from sulfur trioxide and water is eliminated; and a gas stream that can be processed over a commercially available sour shift catalyst at lower steam/dry gas ratios than required for conventional iron-chrome "sweet" shift catalysts results. The auto-refrigerated, J-T flash separation of $CO/CO_2$ provides a highly concentrated $CO_2$ recycle stream comprising <1% CO and <2% $H_2S$ and a concentrated CO stream comprising the net combustion CO and $CO_2$ for shifting to hydrogen. The physical properties of carbon dioxide make this type of $CO/CO_2$ separation process possible, whereas it is not possible to separate nitrogen in this manner.

The selective $H_2S$ removal produces a sulfur free $CO_2$ product that can be compressed to high pressure for use in enhanced oil recovery or liquefied for merchant sales.

Although this embodiment of the present invention shifts CO essentially completely to hydrogen, it is possible to only partially shift the CO to hydrogen thereby producing a $H_2$ and CO synthesis gas mixture. This will reduce the amount of $CO_2$ product by the amount of CO in the synthesis gas.

Although the present invention is herein described in two preferred embodiments with respect to regeneration of fluidized cracker catalyst, it is also contemplated that the invention can be practiced in other fluidized hydrocarbon and petroleum processing systems wherein particulate matter is continuously cycled from a reactor to a regenerator.

For example, the present invention can be utilized in the asphalt residuum treatment process (ART) of Englehard Minerals and Chemicals Corp., as described in U.S. Pat. No. 4,243,514 which is incorporated by reference herein. In the ART process, a heavy residuum which is inappropriate for direct processing in a fluidized catalytic cracking reactor, is initially processed in a fluidized reactor containing a high temperature inert particulate matter, such as a specially treated kaolin clay. High boiling and coking components, as well as metals from the residuum are deposited on hot particulate matter in the fluidized reactor while the remaining residuum is vaporized and removed for refining in a fluidized catalytic cracker. The carbon and metals fouled particulate matter is removed to a regenerator where oxygen and carbon dioxide fluidize the fouled particulate matter and burn the carbon from the inert particles. Metal build-up is allowed to proceed until a predetermined level is achieved and fresh particulate matter is added and metal fouled inert particles are removed from the regenerator. The effluent from the regenerator is treated in a similar manner to that described above. Carbon dioxide from the effluent can be recycled to dilute and moderate the nitrogen-free oxygen feed to the inert particulate matter regnerator.

Figure 3:
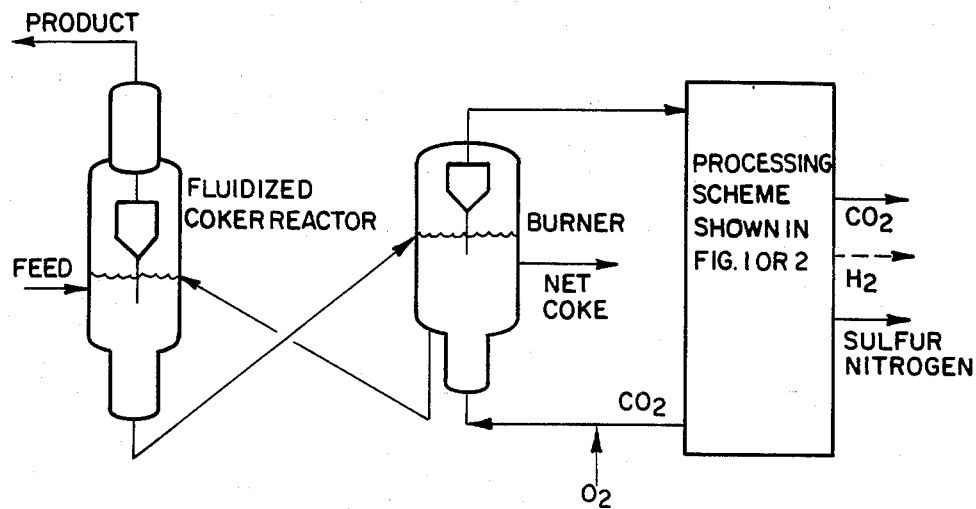
FIG. 3 shows a schematic flow scheme of the process of this invention applied to a fluid coker.

The present invention can also be practiced in a thermal fluidized cracking system as shown in FIG. 3. Exemplary of a thermal system is the fluidcoking process, such as is described in U.S. Pat. No. 2,527,575, which is incorporated by reference herein. In fluidcoking, a hydrocarbon feed, such as a heavy vacuum residuum, is cracked in a fluidized reactor loaded with hot particulate coke. The coke thermally cracks the residuum and in turn fresh carbonaceous matter deposits on the particulate coke. As the process continues, the coke becomes larger and it is necessary to continuously remove some of the carbonaceous material coated coke to reheat it and reduce it in size. The coated coke is removed to a regenerator in order that some of the carbonaceous coating or coke can be burned to produce heat and to remove a part of the net carbon or coke produced in the reactor. Reheated coke is returned to the reactor and a coke product is removed from the regnerator. Again, this regenerator or coke burner can be fluidized and the combustion sustained with a mixture of oxygen and carbon dioxide. The resulting effluent can be treated, and the carbon dioxide recycled as described above.

Figure 4:
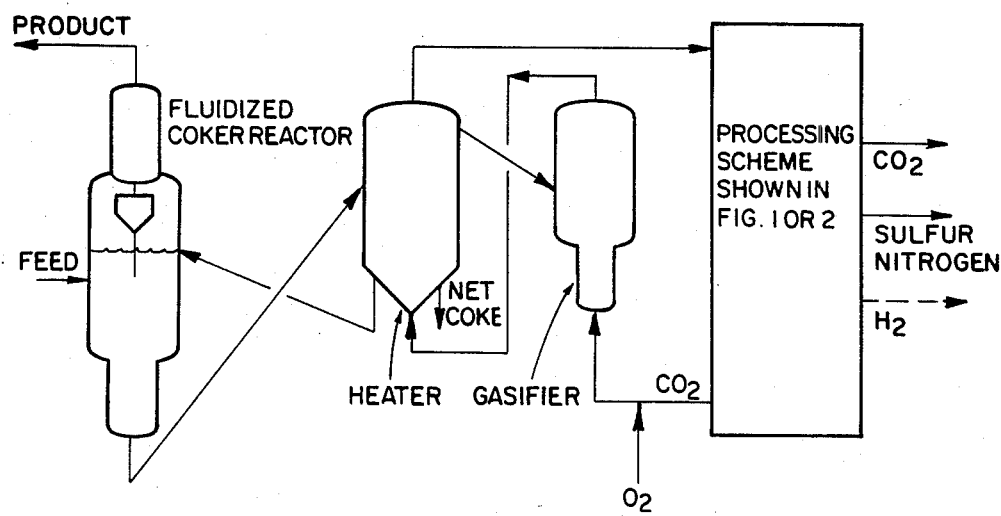
FIG. 4 shows a schematic flow scheme of the process of this invention applied to a fluid coker and gasifier.

In a variation of the fluidcoking system, a flexicoking process can also be operated in the manner of the present invention as shown in FIG. 4. Flexicoking partially combusts the net coke such as is produced in fluidcoking to produce a low BTU fuel gas effluent of high temperature. This effluent, in turn, is used as the fluidizing gas in the regenerator or coke heater. As described in U.S. Pat. No. 3,661,543, which is incorporated by reference herein, flexicoking is a fluidized bed process wherein particulate matter in the form of hot coke cracks the hydrocarbon feed, usually a heavy residuum. Carbonaceous material in the form of additional coke is deposited on the particulate coke of the fluidized reactor, and the coke is reduced in temperature. Part of this coke is then continuously removed to a coke heater. In the coke heater, the cool coke is reheated by a hot, low BTU fuel gas produced by the combustion of coke in yet another vessel, a code gasifier or regenerator. The reheated coke is continuously returned to the reactor and the low BTU fuel gas which gave up heat to the coke is removed from the coke heater as an effluent. The net coke from the reactor which passes through the heater is partially combusted in the gasifier generating the heat necessary for thermal cracking. In the present invention, the gasifier is supplied with a stream of oxygen and carbon dioxide, the latter of which can be recycled carbon dioxide from the effluent of the coke heater. Thus in flexicoking, the oxygen/carbon dioxide is fed to the gasifier or heat regenerator, and the effluent to be treated is removed from the coke heater. This, of course, is the gas produced in the gasifier and heat exchanged in the coke heater.

In this context, the term particulate matter refers to a number of substrates which can be used in a fluidized hydrocarbon refining reactor as contact particles, such as catalyst for catalytic cracking, inert clays for the asphalt residual treatment and coke for the fluidcoking and flexicoking processes. The carbon or coke build-up on such particles is generally termed carbonaceous material. Lastly, in this specification, the term regenerator is understood to include regenerators for fluidized catalytic cracking, burners for the asphalt residuum treatment and the fluidcoking process, and the coke gasifier for the flexicoking process.

The present invention has been described in detail with the specific embodiments set forth above, but it is deemed that the invention could be practiced by one skilled in the art with various modifications. Therefore, the scope of the present invention should not be deemed to be limited to the specific embodiments set forth, but rather should be ascertained from the claims which follow.

I claim:

1. A process wherein the effluent flue gas from the removal of hydrocarbonaceous coke from particulate matter by combustion in a combustion zone with a mixture of commercially pure oxygen diluted to a concentration of 24–30 mole percent with carbon dioxide is treated to provide a carbon dioxide-rich recycle gas stream, comprising the steps of:
   (a) introducing the effluent flue gas into a carbon monoxide combustion stage wherein essentially all of the carbon monoxide content of the gas is converted to carbon dioxide by combustion with oxygen gas;
   (b) reducing the temperature of the resulting combusted effluent gas of step (a) by indirect heat exchange in a waste heat boiler and recovering the waste heat from said gas;
   (c) direct cooling and quenching the effluent gas by the introduction of a water stream into the gas with the attendant condensation of water of combustion and the entrainment of particulates into the water stream with subsequent removal of the stream from the gas and without significant adsorption of sulfur dioxide from the gas;
   (d) compressing the effluent gas to approximately the inlet pressure of the combustion zone;
   (e) separating the effluent gas into a carbon dioxide-rich recycle gas stream which constitutes 61–80 percent of the effluent stream and a remaining net gas stream which comprises the balance of the effluent stream;
   (f) recycling the carbon dioxide-rich recycle gas stream to the combustion zone as the diluent for oxygen fed to the zone for combustion;
   (g) compressing the net gas stream to a further elevated pressure;
   (h) aftercooling the compressed net gas stream with the attendant removal of condensed water;
   (i) drying the net gas stream to remove essentially any residual moisture, and
   (j) distilling the net gas stream to recover a gaseous overhead stream of oxygen and carbon dioxide, a liquid carbon dioxide stream formed by the condensed reflux of the distillation and a liquid bottom stream containing oxides of sulfur and nitrogen.

2. The process of claim 1 wherein a portion of the carbon dioxide recycle stream is removed and introduced into the carbon monoxide combustion stage to moderate the temperature of combustion.

3. The process of claim 1 further including the step of recycling substantially all of the gaseous overhead stream of oxygen and carbon dioxide in step (j) to the combustion zone to be mixed with oxygen and recycled carbon dioxide.

4. A process wherein the effluent flue gas from the removal of hydrocarbonaceous coke from particulate matter by complete combustion in a combustion zone, wherein essentially no residual carbon monoxide exists, with a mixture of oxygen diluted to a concentration of 24–30 mole percent with carbon dioxide is treated to provide a carbon dioxide-rich recycle gas stream comprising the steps of:
   (a) reducing the temperature of the resulting combusted effluent gas by indirect heat exchange in a waste heat boiler and recovering the waste heat from said gas;
   (b) direct cooling and quenching the effluent gas by the introduction of a water stream into the gas with the attendant condensation of water of combustion and the entrainment of particulates into the water stream with subsequent removal of the stream from the gas and without significant absorption of sulfur dioxide from the gas;
   (c) compressing the effluent gas to approximately the inlet pressure of the combustion zone;
   (d) separating the effluent gas into a carbon dioxide-rich recycle gas stream which constitutes 61–80 percent of the effluent stream and a remaining net gas stream which comprises the balance of the effluent stream;
   (e) recycling the carbon dioxide-rich recycle gas stream to the combustion zone as the diluent for oxygen fed to the zone for combustion;
   (f) compressing the net gas stream to a further elevated pressure;
   (g) aftercooling the compressed net gas stream with the attendant removal of condensed water;
   (h) drying the net gas stream to remove essentially any residual moisture, and
   (i) distilling the net gas stream to recover a gaseous overhead stream of oxygen and carbon dioxide, a liquid carbon dioxide stream produced from the condensed reflux of the distillation and a liquid bottom stream containing oxides of sulfur and nitrogen.

5. The process of claim 4 further including the step of recycling substantially all of the gaseous overhead stream of oxygen and carbon dioxide of step (j) to the combustion zone to be mixed with oxygen and recycled carbon dioxide.

6. A process wherein the effluent flue gas from the removal of hydrocarbonaceous coke from particulate matter by combustion in a combustion zone with a mixture of oxygen diluted to a concentration of 24–30 mole percent with carbon dioxide is treated to provide a carbon dioxide-rich recycle gas stream and a carbon-monoxide-rich stream for further processing, comprising the steps of:

(a) reducing the temperature of the effluent flue gas from the combustion zone to 150°–425° C. and recovering waste heat;

(b) passing the effluent flue gas over a deoxygenation and reducing catalyst to eliminate oxygen and reduce $SO_X$ to $H_2S$ and $NO_X$ to $N_2$;

(c) further reducing the temperature of the effluent flue gas recovering waste heat;

(d) quenching the effluent flue gas by the introduction of a water stream into the gas with the attendant condensation of water of combustion and the entrainment of particulates into the water stream with subsequent removal of the stream from the gas and without significant absorption of sulfur from the gas;

(e) compressing the effluent flue gas to a pressure in the range of 10 to 20 atm. and drying the pressurized stream;

(f) separating a carbon dioxide-rich recycle stream and a net combustion product gas in a low temperature phase separation of the effluent flue gas;

(g) recycling the carbon dioxide-rich recycle stream to the combustion zone as the diluent for oxygen fed to the zone for combustion;

(h) compressing the net combustion product gas to an elevated pressure;

(i) converting at least a part of the carbon monoxide content of the net combustion product stream by the shift reaction to reduce the carbon monoxide content of the stream and produce hydrogen and additional carbon dioxide, and (j) separating the stream into a carbon dioxide stream, a hydrogen stream and a hydrogen sulfide stream by a solvent sorption system.

7. The process of claim 6 wherein the separation of step (f) is performed predominantly with auto refrigeration.

8. The process of claim 6 wherein the separation of step (j) is performed by a physical solvent which selectively absorbs $H_2S$ to a greater extent than $CO_2$ and does not absorb an appreciable amount of $H_2$.

9. The process of claim 6 wherein the shifting of carbon monoxide of step (i) is only partially complete and the separation of step (j) results in the hydrogen stream having a significant carbon monoxide content.

* * * * *